United States Patent

Matsuoka et al.

[11] Patent Number: 6,023,836
[45] Date of Patent: Feb. 15, 2000

[54] METHOD OF FORMING A SHAFT FIXING APERTURE IN A PLATE-LIKE CARRYING MEMBER

[75] Inventors: Yoshihiro Matsuoka; Kouji Yoneyama, both of Neyagawa, Japan

[73] Assignee: Exedy Corporation, Osaka, Japan

[21] Appl. No.: 09/039,627

[22] Filed: Mar. 16, 1998

[30] Foreign Application Priority Data

Mar. 18, 1997 [JP] Japan .................................. 9-064999

[51] Int. Cl.⁷ .................................................. B23P 13/04
[52] U.S. Cl. ............................................ 29/557; 475/331
[58] Field of Search ............................. 29/557; 475/348, 475/331

[56] References Cited

U.S. PATENT DOCUMENTS

| | | |
|---|---|---|
| 4,474,278 | 10/1984 | Miura . |
| 4,597,479 | 7/1986 | Kitano et al. . |
| 4,664,240 | 5/1987 | Majima et al. . |
| 4,756,212 | 7/1988 | Fuehrer ..................................... 74/750 |
| 4,924,978 | 5/1990 | Ohkubo . |
| 4,942,779 | 7/1990 | Ohkubo . |
| 5,593,015 | 1/1997 | Kosumi et al. . |

*Primary Examiner*—P. W. Echols
*Assistant Examiner*—John C. Hong
*Attorney, Agent, or Firm*—Shinjyu Global IP Counselors, LLP

[57] ABSTRACT

Automatic transmissions of automobiles and the like often employ planetary gear mechanisms. In conventional planetary gear mechanisms, a carrier is utilized for supporting shafts of a pinion or planetary gear. One of the carriers is provided with fixing apertures that position and prevent rotation of the pinion shafts of the pinion or planetary gears coupled thereto. The carrier with the fixing apertures is manufactured by pressing a sheet metal member into the desired shape such that one radially extending surface has a plurality of first cavities. These first cavities are preferably rectangular. After the sheet material is pressed, a plurality of second apertures or cavities is formed on the opposite radially extending facing surface of the sheet metal. These second cavities are preferably circular. These second cavities overlap with the first cavities such that a passageway is formed between the first and second cavities. The shafts of the pinion or planetary gears have a D-shaped projection with a flat area for engaging a flat area of the first cavities such that rotation between the carrier and the pinion shafts are prevented.

18 Claims, 9 Drawing Sheets

METHOD OF FORMING A SHAFT FIXING APERTURE IN A PLATE-LIKE CARRYING MEMBER

BACKGROUND OF THE INVENTION

A. Field of the Invention

The present invention relates to a method for processing a plate-like carrying member to mount a shaft of a gear or the like. More particularly, the present invention relates to a method for forming one or more shaft fixing apertures having a function of stopping rotation in the plate-like carrying member.

B. Description of the Background Art

Generally, automatic transmissions of automobiles and other types of transmissions often employ planetary gear mechanisms therein. In conventional planetary gear mechanisms, the shafts of the pinions (planetary gears) are generally fixed to a carrier by fitting and caulking. In particular, one end of each of the pinion shafts is received in one aperture in the carrier.

In the prior art, however, the apertures in the carrier are typically holes with simple circular cross-sections, with the end of the pinion shafts having simple circular cross-sections such that the pinion shafts fit into the apertures of the carrier. Therefore, in these prior art devices, it is difficult to stop rotation of the pinion shaft with the apertures of the carrier. Moreover, it is difficult to stop axial movement of the pinion shafts within the apertures of the carrier.

In view of this, some prior art devices have already been proposed that use stepped apertures and stepped pinion shafts. The stepped portions of the apertures are formed at an inner peripheral surface of the shaft fixing aperture in the carrier, while the stepped portions of the pinion shafts are formed at an outer peripheral surface of the pinion shaft. The stepped portions, the apertures and the pinion shafts are engaged together for stopping rotational and axial movement of the pinion shafts within the shaft fixing apertures of the carrier.

In the structure already proposed, however, the shaft fixing apertures with the stepped portions are formed in the carrier by casting. Therefore, manufacturing of the carrier is quite time-consuming work and often expensive.

SUMMARY OF THE INVENTION

One object of the invention is to provide a simple method of forming a shaft fixing aperture as a plate-like carrying member.

In accordance with one aspect of the present invention, a method is carried out for processing a plate-like carrying member to form at least one shaft-fixing aperture therein. More specifically, a sheet metal member is stamped and milled to form shaft-fixing apertures. The shaft-fixing apertures each receive one end of a shaft which is provided at its end with a rotation stop portion. Each shaft fixing aperture is formed of a first cavity formed at a first surface remote from the shaft and a second cavity formed at a second surface opposite to said first surface. Each first cavity is provided with a rotation stop surface for engagement with the rotation stop portion of the shaft. A passageway partially connects the first cavity to the second cavity. Each second cavity has an inner peripheral surface to be in close contact with an outer peripheral surface portion of the shaft near the end and a bottom surface to be in contact with an end surface of the shaft.

The forming method includes the steps of forming the first cavity in the first surface of the plate-like carrying member by press working, and forming the second cavity in the second surface of the plate-like carrying member by cutting after the press working. According to this method, the plate-like carrying member provided with the shaft fixing aperture, which has predetermined functions of preventing rotation and positioning the shaft, can be formed by simple processing compared with the prior art employing casting.

The foregoing and other objects, features, aspects and advantages of the present invention will become more apparent from the following detailed description, when taken in conjunction with the accompanying drawings.

BRIEF DESCRIPTION OF THE DRAWINGS

FIG. 7b is a right side elevational view of the carrier illustrated in FIGS. 1, 6 and 7a;

DESCRIPTION OF THE PREFERRED EMBODIMENTS

Figure 1:
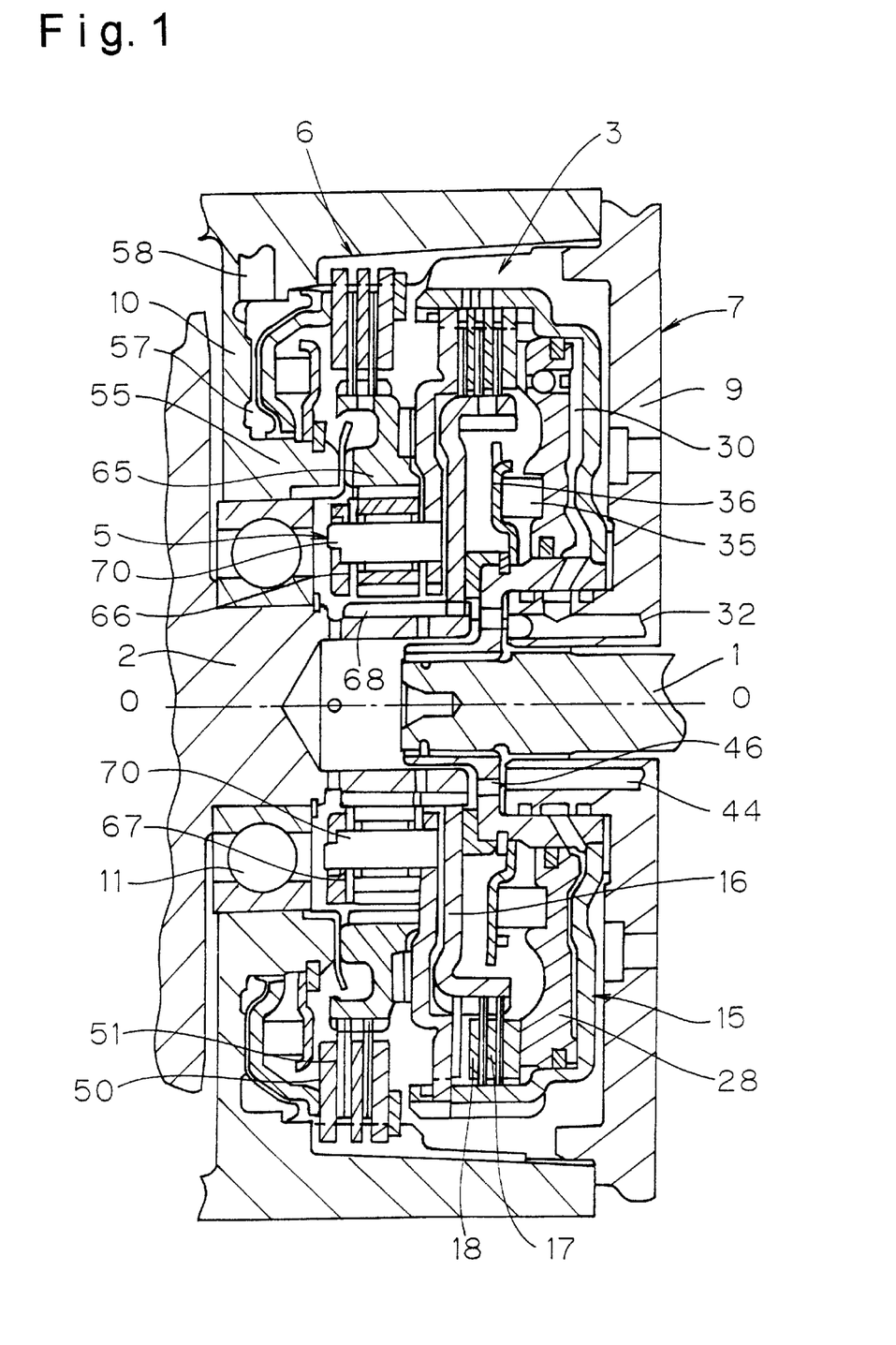
FIG. 1 is a fragmentary, cross-sectional view of an automatic transmission utilizing a pair of multiple disk clutches in accordance with one embodiment of the present invention, with structure for directing the lubricating oil to the friction plates.

Referring initially to FIG. 1, a cross-sectional view of an automatic transmission employing a pair of multiple disk clutches 3 and 6 in accordance with one embodiment of the present invention is illustrated. The transmission shown in FIG. 1 includes an input shaft 1 and an output shaft 2 which are coaxial with each other. A first multiple disk clutch 3 is coupled to input shaft 1 and extends radially outwardly from the input shaft 1. A planetary gear mechanism 5 is coupled to the output shaft 2 and extends radially outwardly from the output shaft 2. A second multiple disk clutch 6 is coupled to the planetary gear mechanism 5 and extends radially outwardly from the planetary gear mechanism 5.

The multiple disk clutches 3 and 6 as well as the planetary gear mechanism 5 are located inside a housing assembly 7. The input shaft 1 extends into housing assembly 7 through an aperture formed in an end wall 9 of the housing assembly 7 such that the inner end of input shaft 1 has first multiple disk clutch 3 coupled thereto. The output shaft 2 extends into the housing assembly 7 through a bearing aperture at the other end wall 10 of the housing assembly 7. The output shaft 2 is rotatably coupled in the bearing aperture by a bearing 11.

Figure 2:
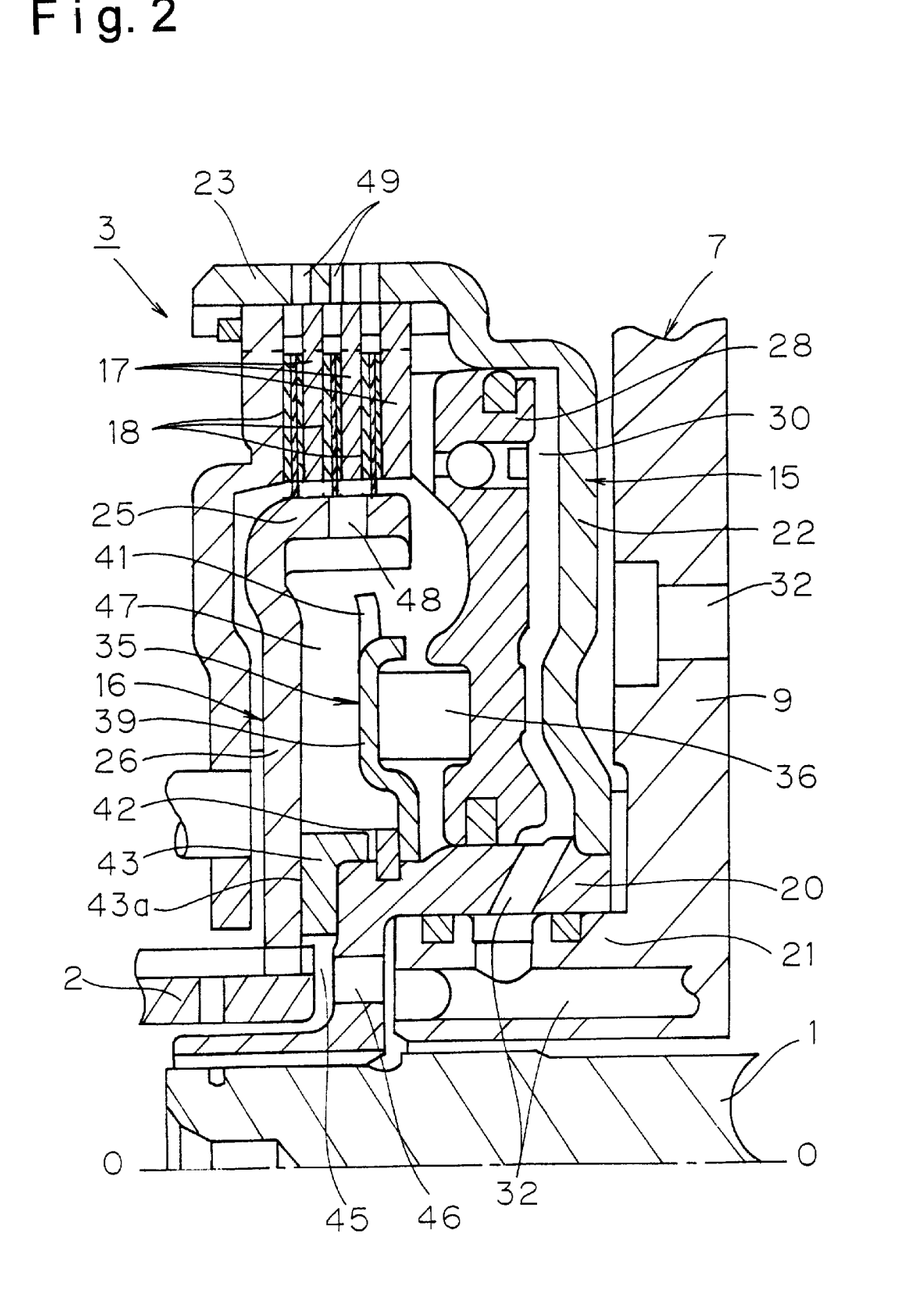
FIG. 2 is an enlarged, partial cross-sectional view of the automatic transmission showing an upper portion of the right or first multiple disk clutch illustrated in FIG. 1.

Turning now to FIG. 2, an enlarged portion of the upper section of the first multiple disk clutch 3 is shown. The first multiple disk clutch 3 includes an input member or assembly 15, an output member 16, a plurality of input or first friction plates 17 and a plurality of output or second friction plates 18.

The input member or assembly 15 (first member) is fixed at its inner periphery to the outer periphery of the input shaft 1 through spline teeth for rotation therewith. The input assembly 15 has an inner cylindrical portion 20, which is located near the inner periphery of the input assembly 15, an annular portion 22 extending radially outwardly from the cylindrical portion 20 and a first outer cylindrical portion 23 coupled to the outer peripheral end of the annular portion 22. The cylindrical portion 20 is rotatably mounted around a cylindrical portion 21 extending from the end wall 9. An oil seal is located between the interface of cylindrical portions 20 and 21 for creating a seal therebetween. An inner periphery of an annular portion 22 of the input assembly 15 is fixed to the outer periphery of the end of the inner cylindrical portion 20 adjacent to the end wall 9. The annular portion 22 extends substantially radially from the inner cylindrical portion 20. The first outer cylindrical portion 23 is integrally coupled to the outer periphery of the annular portion 22 as a one-piece, unitary member. The first outer cylindrical portion 23 extends axially from the outer periphery of the annular portion 22 away from the end wall 9.

The first (input) and second (output) friction plates 17 and 18 of the first multiple disk clutch 3 are located radially inside the first outer cylindrical portion 23, and alternate axially relative to each other. Each of the input or first friction plates 17 is provided at its outer periphery with claws which engage axial grooves formed at the inner periphery of the first outer cylindrical portion 23 so that each first friction plate 17 is axially movably and relatively non-rotatably coupled to the first outer cylindrical portion 23 of the input assembly 15.

The output member 16 (second member) is provided at its outer peripheral portion with a second outer cylindrical portion 25 which is spaced radially inwardly from the first outer cylindrical portion 23 of the input assembly 15. Claws formed at the inner periphery of each second friction plate 18 are engaged with axial grooves (FIG. 1) formed at the outer periphery of the second outer cylindrical portion 25 so that each second friction plate 18 is movably coupled to the output member 16 in an axial direction but non-rotatably coupled to the output member 16. The output member 16 is provided with an annular portion 26 which extends radially inward from the end of the second outer cylindrical portion 25 remote from the end wall 9. The inner periphery of the annular portion 26 is coupled to the outer periphery of the end of the output shaft 2 through spline teeth.

As seen in FIGS. 1 and 2, a piston or pressure plate 28 is axially arranged between the annular portion 22 of the input assembly 15 and the output member 16. The pressure plate 28 has an outer portion with one of its radial faces positioned adjacent to one of the first friction plates 17. The pressure plate 28 is slidably fitted at its outer periphery to the inner peripheral surface of the first outer cylindrical portion 23 of the input assembly 15. An oil seal is positioned between the interface of the first outer cylindrical portion 23 and the pressure plate 28 for creating a seal therebetween. The pressure plate 28 is also slidably fitted at its inner periphery to the outer periphery of the inner cylindrical portion 20 of the input assembly 15. An oil seal is positioned between the inner cylindrical portion 20 and the pressure plate 28 for creating a seal therebetween. A working fluid chamber 30 is formed between the pressure plate 28 and the input assembly 15. The working fluid chamber 30 is connected to a hydraulic pressure control mechanism (not shown) arranged at an external position through an oil passage 32 formed at the end wall 7 and other oil passages (not shown).

A spring retaining member 35 is arranged between the pressure plate 28 and the annular portion 26 of the output member 16. The spring retaining member 35 is formed of an annular plate extending substantially radially from inner cylindrical portion 20 of input assembly 15. A return spring 36 is interposed between the spring retaining member 35 and the pressure plate 28. Although not show clearly, the return spring 36 is made of a spring strip having a wavy section, and extends spirally around the inner cylindrical portion 20 as a whole. Therefore, the return spring 36 is retained by the spring retaining member 35, and biases the pressure plate 28 away from the first friction plate 17.

Figure 3:
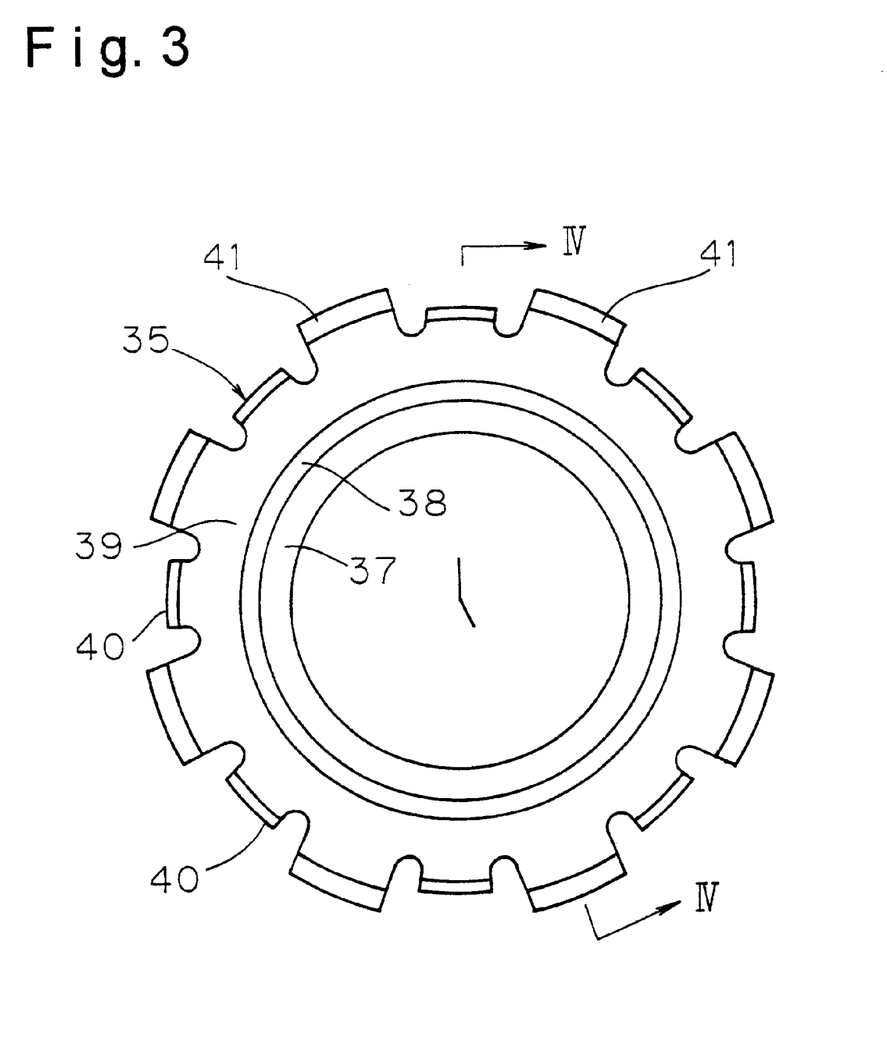
FIG. 3 is a right side elevational view of a spring retainer of the right or first multiple disk clutch illustrated in FIGS. 1 and 2.
Figure 4:
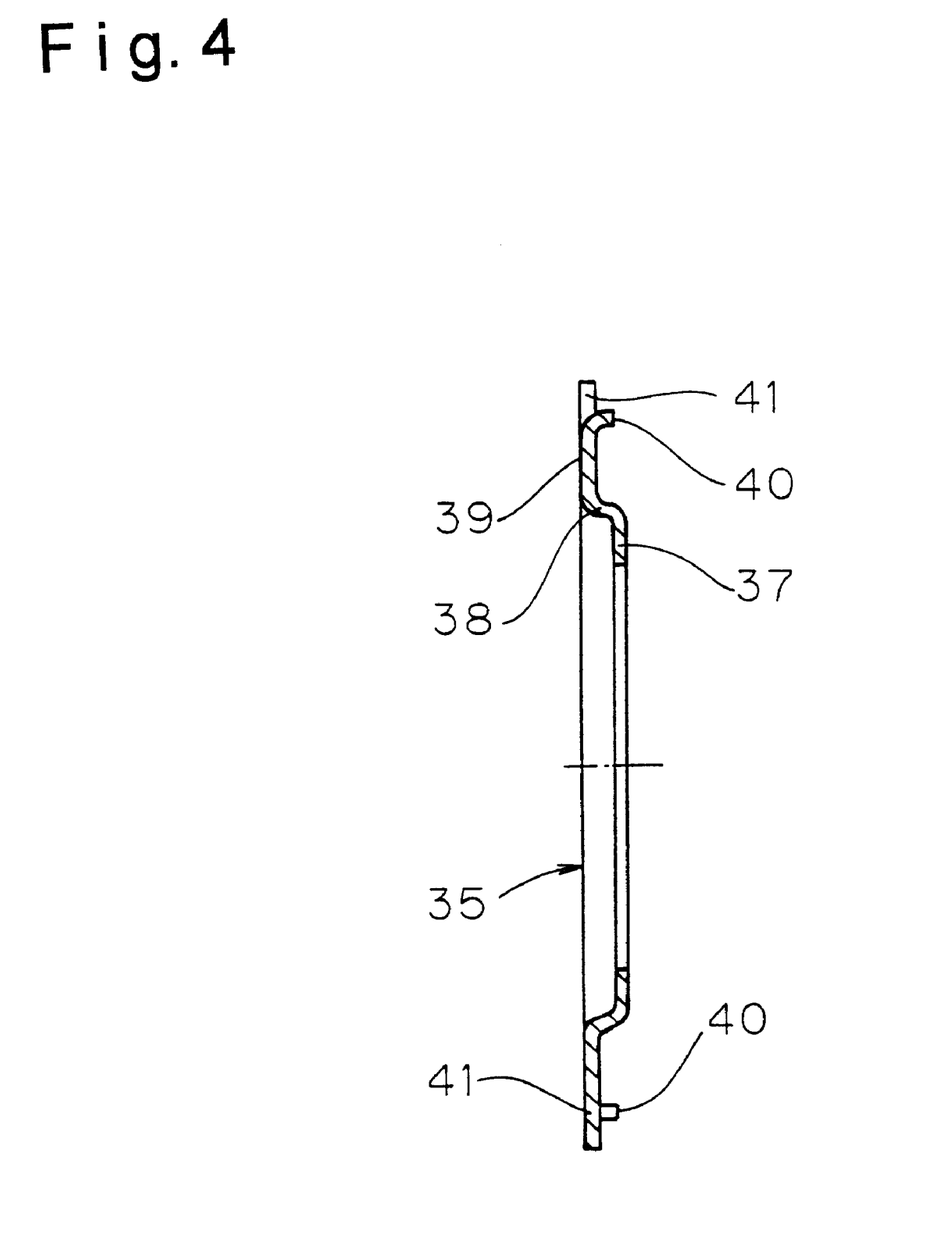
FIG. 4 is a cross-sectional view of the spring retainer illustrated in FIG. 3 taken along line IV—IV in FIG. 3.

Referring now to FIGS. 3 and 4, right end elevational view of the spring retaining member 35 is shown in FIG. 3, and a cross-sectional view of the spring retaining member 35 is shown in FIG. 4 as viewed along line IV—IV in FIG. 3. As can be seen from FIGS. 3 and 4, the spring retaining member 35 includes an inner portion 37, a curved portion 38, an annular seat portion 39, curved portions 40 and guide portions 41. Inner portion 37 of retaining member 35 defines a circular opening at its inner periphery for mounting on the inner cylindrical portion 20 of input assembly 15 as seen in FIGS. 1 and 2. The curved portion 38 of the spring retaining member 35 extends from the outer periphery of the inner portion 37 and curves away from the pressure plate 28 as seen in FIG. 2. Annular spring seat portion 39 extends radially outwardly from the curved portion 38, with the outer periphery of annular spring seat portion 39 having curved portions 40 guide portions 41 coupled thereto. The curved portions 40 extend from the outer periphery of the spring seat portion 39 toward the pressure plate 28 as seen in FIG. 2. The return spring 36, as seen in FIG. 2, has an end seated on the spring seat portion 39, and is prevented from shifting in a radial direction by the curved portions 38 and 40 as seen in FIGS. 3 and 4.

As seen in FIG. 3, eight curved portions 40 are formed at the outer periphery of the spring seat portion 39 such that the curved portions 40 are circumferentially spaced apart from each other. Guide portions 41 are arranged between adjacent curved portions 40 in an alternating fashion. In other words, the plurality of curved portions 40 and the plurality of guide portions 41 alternate relative to each other at the outer periphery of the spring seat portion 39. Each guide portion 41 is designed (sized and shaped) for guiding the lubricating oil towards the friction plates 17 and 18, as will be described later. Specifically, guide portions 41 extend radially outward from the outer periphery of the spring seat portion 39 so that the lubricating oil is centrifugally guided towards the friction plates 17 and 18.

Referring again to FIG. 2, the inner periphery of the spring retaining member 35 is supported from the side remote from the pressure plate 28 by a snap ring 42 fixed to the outer periphery of the inner cylindrical portion 20 of input assembly 15. A thrust bearing 43 is arranged between the radially inner portion of the output member 16 and the end of the cylindrical portion 20 opposed thereto.

Referring now to FIGS. 1 and 2, an annular space 45 is formed radially inside the thrust bearing 43. The inner cylindrical portion 20 of input assembly 15 is provided with an oil passage 46 communicating with the annular space 45. The housing assembly 7 is provided at the cylindrical portion 21 with an oil passage 44 which communicates with the oil passage 46. Oil passage 44 is different from the foregoing oil passage 32 for the working fluid. The thrust bearing 43 is provided at the radially facing surface, which is in contact with the output member 16, with a plurality of grooves 43a (oil passages) extending radially therethrough. Each groove 43a connects the annular space 47 containing the spring retaining member 35 to the annular space 45.

The output member 16 is provided at the second outer cylindrical portion 25 with a plurality of oil apertures 48 which extend radially between the inner and outer peripheries of the second outer cylindrical portion 25. The oil apertures 48 are preferably circumferentially and equally spaced from each other about the second outer cylindrical portion 25. Preferably, the second outer cylindrical portion 25 has at least eight oil apertures 48 with each oil aperture 48 being aligned with one of the guide portions 41. Of course, fewer or more oil apertures 48 can be provided as needed. The radial surfaces of the guide portions 41 which radially face the pressure plate 28 are substantially aligned radially with portions of edges of the oil apertures 48 near the pressure plate 28. As shown in FIG. 3, the guide portions 41 are preferably equally and circumferentially spaced from each other. Accordingly, guide portions 41 are located radially inside the oil apertures 48 in FIG. 2, respectively, with each guide portion 41 aligning with one of the oil apertures 48.

Figure 5:
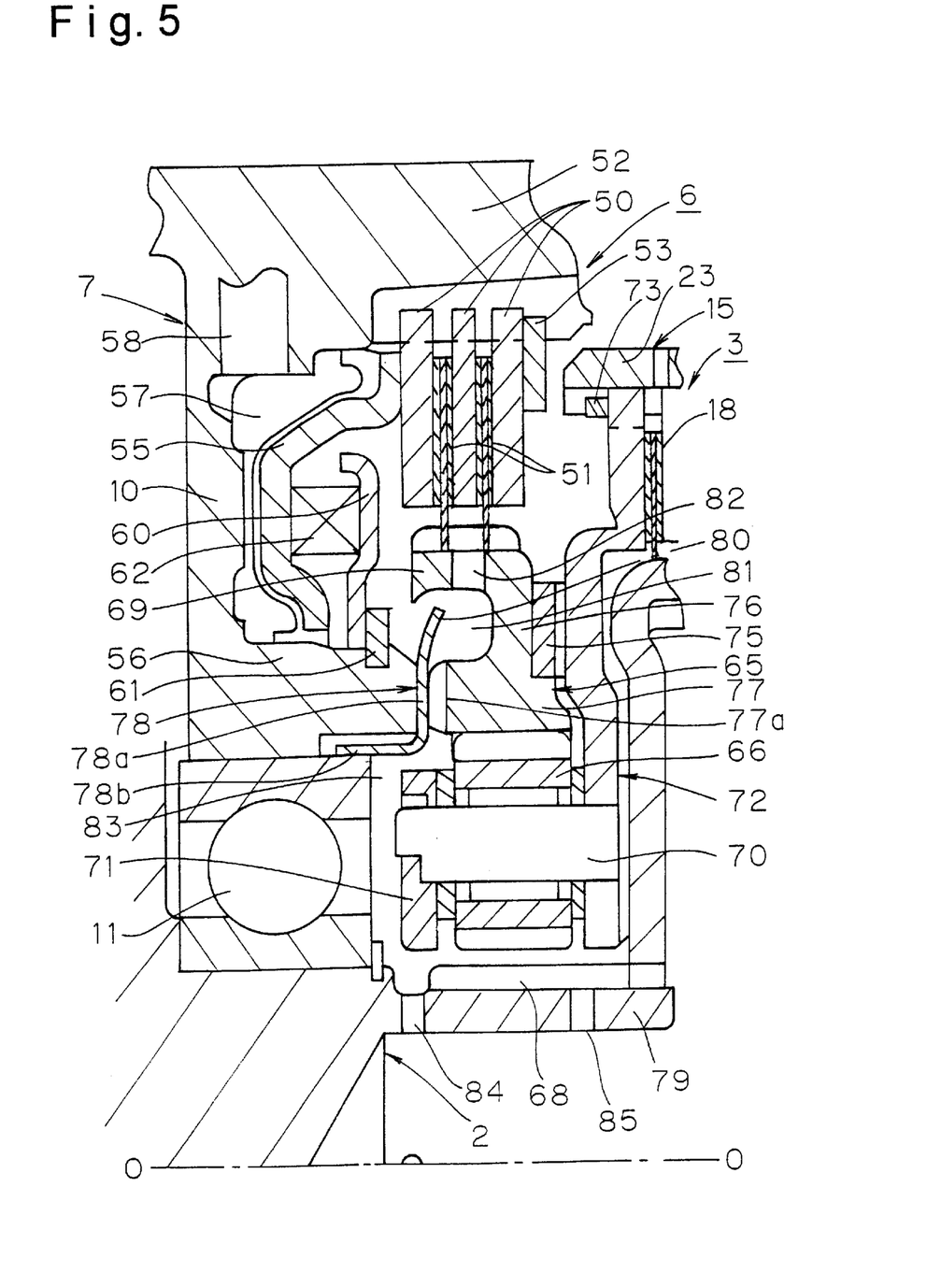
FIG. 5 is an enlarged, partial cross-sectional view of the automatic transmission showing the upper portion of the left or second multiple disk clutch illustrated in FIG. 1.

Referring to FIG. 5, the planetary gear mechanism 5 and the multiple disk clutch 6 will now be described below in more detail. The multiple disk clutch 6 forms a brake, and therefore includes two kinds of friction plates, i.e., three stationary first friction plates 50 and two rotatable second friction plates 51 arranged between the plates 50. Each first friction plate 50 is provided at its outer periphery with claws, which movably engage grooves formed at the inner periphery of an outer peripheral wall 52 (first cylindrical portion or first component) of the housing assembly 7 for allowing axial movement but not rotational movement.

A stop plate 53 supports the first friction plate 50 which is farthest from the end wall 10. More specifically, the stop plate 53 supports the surface of this end friction plate 50 remote from the second friction plate 51. The stop plate 53 has an outer peripheral portion which is fixedly engaged with a groove at the inner periphery of the outer peripheral wall 52.

A radially outer portion of a pressure or piston plate 55 (piston) engages the first friction plates 50 nearest to the end wall 10. More specifically, the piston plate 55 engages a radial surface of the end friction plate 50 remote from the second friction plate 51. The outer periphery of the piston plate 55 is slidably fitted to the inner periphery of the outer peripheral wall 52. The inner periphery of the piston plate 55 is slidably fitted to the outer periphery of a cylindrical portion 56 integrally projected from the end wall 10. The working fluid chamber 57 is formed between the end wall 10 and the piston plate 55. The working fluid chamber 55 is connected to a hydraulic pressure control mechanism (not shown) through an oil passage 58 formed at the outer peripheral wall 52 and others.

The cylindrical portion 56 has a portion, which projects beyond the piston plate 55, and carries an inner periphery of an annular spring retainer 60 fixed thereto by a snap ring 61. A return spring 62 is arranged between the snap ring 61 and the piston plate 55. The return spring 62 has a structure similar to that of the return spring 36 already described with reference to FIG. 2.

The planetary gear mechanism 5 includes a ring gear, i.e., a spline hub 65, two kinds of pinions 66 and 67 (planet gears) (FIG. 1), and a sun gear 68. The ring gear or spline hub 65 is coaxially mounted about output shaft 2 which has the sun gear 68 fixedly coupled thereto. The ring gear or spline hub 65 is operatively coupled to the sun gear 68 by pinions 66 and 67. The spline hub 65 (second component) serves also as a component of the multiple disk clutch 3, and has a second cylindrical portion 69 at its outer periphery. Claws at the inner periphery of the second friction plate 51 are engaged with grooves which are formed at the outer periphery of the second cylindrical portion 69 so that the second friction plate 51 is axially slidably and relatively non-rotatably coupled to the spline hub 65.

The sun gear 68 is formed of a cylindrical portion 79 formed at the end of the output shaft 2. The plurality of pinions 66 (only one is shown) and the plurality of pinions 67 (only one is shown in FIG. 1) are arranged circumferentially and alternately relative to each other in an annular space between the spline hub 65 and the sun gear 68. The pinions 66 are in mesh with the inner teeth of the spline hub 65 forming the ring gear. The other pinions 67 shown in FIG. 1 are in mesh with the outer teeth of the sun gear 68.

The pinions 66 and 67 are carried by pinion shafts 70 parallel to the input shaft 1 through bearings, respectively. Each pinion shaft 70 is fixed at its opposite ends to annular carriers or carrying members 71 and 72, respectively. The carrier 71 is formed of an annular plate having a relatively small radial width. The carrier 72 has an outer diameter larger than that of the carrier 71, and specifically has the following structure.

The radially outer portion of the carrier 72 is in contact with the second friction plate 18 of the multiple disk clutch 3 nearest to the end wall 10. The carrier 72 is provided at its outer periphery with claws which are engaged with axial grooves formed at the inner periphery of the first outer cylindrical portion 23 of the input assembly 15. A snap ring 73 is attached to the inner periphery of the free end of the first cylindrical outer portion 23 for preventing movement of the carrier 72 away from the second friction plate 18.

A radially middle portion of the carrier 72 is in axial contact with a radially middle portion 76 of the spline hub 65 through a thrust bearing 75.

A cylindrical inner peripheral portion 77 of the spline hub 65 and more specifically an end surface thereof remote from the carrier 72 is in contact with the end surface of the cylindrical portion 56 of the housing assembly 7 through a thrust washer 78.

The thrust washer 78 includes a support portion 78a, a cylindrical middle portion 78b and an outer cylindrical guide portion 80. Support portion 78a extends radially through a position between the cylindrical inner peripheral portion 77 and the cylindrical portion 56, and an annular extension which projects outward from the support portion 78a and forms a guide portion 80. The guide portion 80 of the thrust washer 78 defines an annular space 81 together with the middle portion 76 of the spline hub 65. The guide portion 80 of the thrust washer 78 is slightly inclined such that it approaches the edge portions of oil apertures 82 near the end wall 10 as the position moves radially outward. In other words, the radial surface of guide portion 80 which faces middle portion 76 of spline hub 65 has its outer peripheral edge substantially aligned with the edges of the oil apertures 82 which are closest to the end wall 10. The cylindrical portion 78b of thrust washer 78 extends from the inner periphery of the support portion 78a away from the spline hub 65. The cylindrical portion 78b is in contact with the outer peripheral surface of the outer race of the bearing 11.

The oil apertures 82 are formed at the second cylindrical portion 69 of the spline hub 65 surrounding the outer periphery of the space 81. More specifically, the oil apertures 82 are circumferentially spaced apart from each other along the circumference of the portion 69. The oil apertures radially connect the axial grooves at the outer periphery of the second cylindrical portion 69 to the space 81, respectively.

The spline hub 65 is provided at the end surface of the inner peripheral portion 77 with a plurality of grooves 77a (oil passages) connecting a space 83 radially inside the portion 77 to the space 81. The space 83 is in communication with the oil passage 46 (FIG. 1) through oil passages 84 and 85 formed at the cylindrical portion 79 of the output shaft 2.

Each of the pinion shafts 70 is fixed to the carrier 72 by fitting and caulking the cylindrical end of the pinion shaft 70 into a circular aperture at the carrier 72. In the illustrated embodiment, the structure for fixing the pinion shaft 70 and the carrier 71 together is devised as follows.

Figure 6:
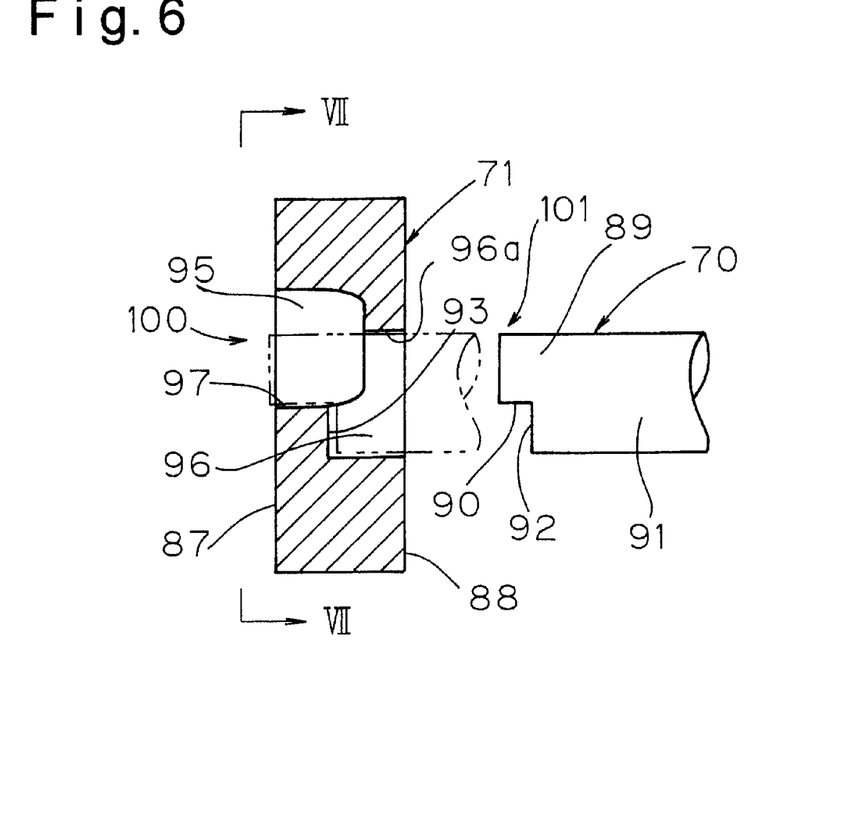
FIG. 6 is an enlarged, partial cross-sectional view of a pinion and a carrier illustrated in FIG. 1 before assembly, and with the pinion shown in broken lines after assembly.
Figure 7A:
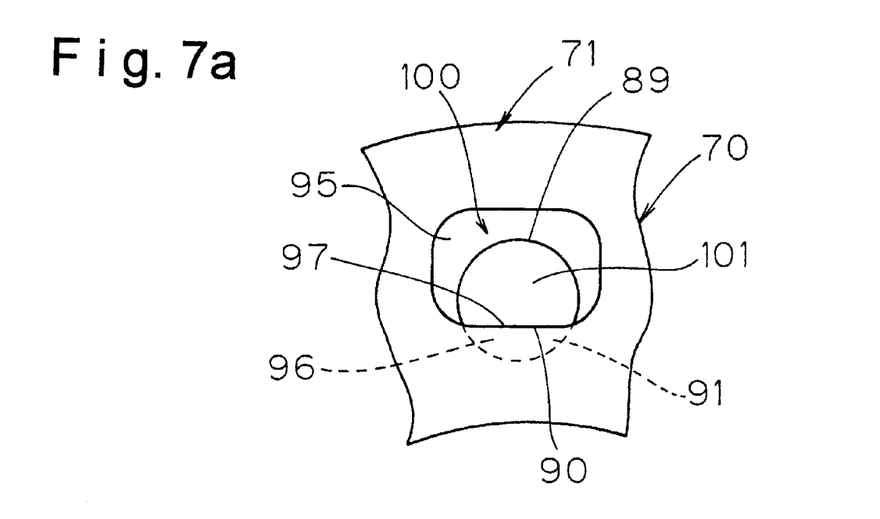
FIG. 7a is an enlarged, partial left side elevational view of a portion of the carrier and pinion illustrated in FIGS. 1 and 6 as viewed along line VII—VII in FIG. 6.

As seen in FIG. 6, the pinion shaft 70 and the carrier 71 are illustrated in an exploded state with the pinion shaft 70 shown in broken lines to illustrate the assembled position. FIG. 7a is a view taken along line VII—VII in FIG. 6. In these figures, the pinion shaft 70 having an outer peripheral surface 91 which is cylindrical in form, and has a circular cross-section for rotatably supporting pinion 66. The outer periphery of the end of the pinion shaft 70 is partially recessed to form a semicircular or nearly D-shaped end section. In other words, the pinion shaft 70 is provided at its end with a projection 101 which is partially and linearly recessed. The outer peripheral surface of the projection 101 is formed of a partially cylindrical surface 89 and a flat surface 90 (rotation stop). The partially cylindrical portion 89 has a section which extends circularly through an angle over 180 degrees. The end portion of the pinion shaft 70 other than the projection 101 forms an end surface 92.

Figure 7B:
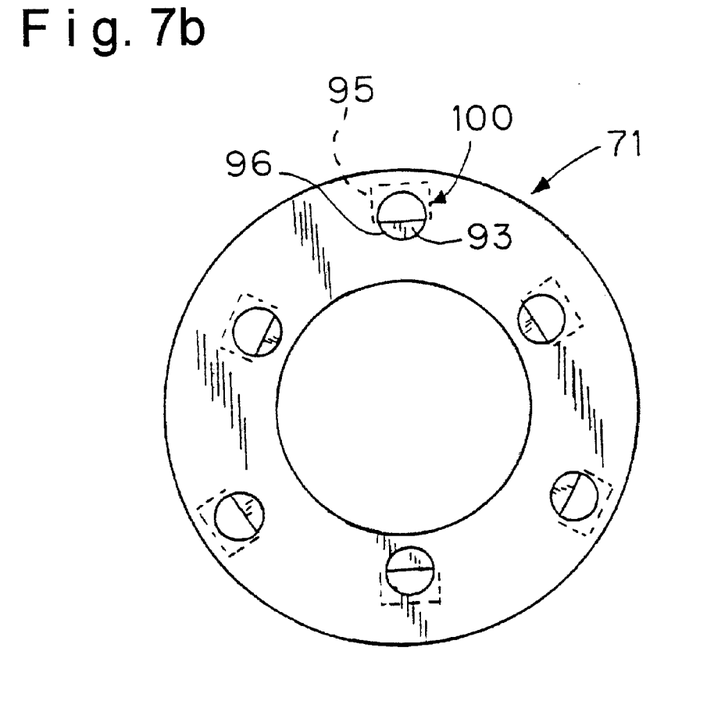
Figure 7C:
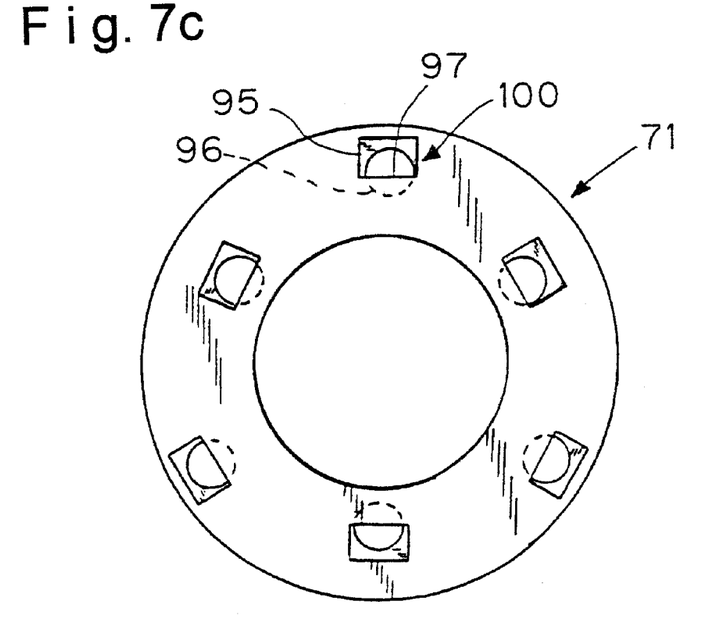
FIG. 7c is a left side elevational view of the carrier illustrated in FIGS. 1, 6, 7a and 7b.

As seen in FIGS. 7b and 7c, the carrier 71 is provided with a plurality of fixing apertures 100 into which ends of the pinion shafts 70 are fixed with anti-rotation structures, respectively. A first set of fixing apertures 100 are arranged in a first substantially circular pattern for receiving pinion shafts 70 of pinions 66, and a second set of fixing apertures 100 are arranged in a second substantially circular pattern of a smaller diameter than the first pattern for receiving pinion shafts 70 of pinions 67. While six fixing apertures 100 are illustrated, it will be apparent to those skilled in the art that carrier 71 can be provided with more fixing apertures if more than three pinions 66 and/or more than three pinions 67 are used. Each fixing aperture 100 is formed of first and second cavities 95 and 96 having bottoms continuous to each other. The first and second cavities 95 and 96 have different forms and are shifted from each other. Therefore, each fixing aperture 100 has a stepped portion at its inner periphery. The first cavity 95 is formed in the first radial surface 87 of the carrier 71, and the second cavity 96 is formed in the other or second radial surface 88.

The first cavity 95 is substantially rectangular in a plan view, and has a flat rotation stop surface 97 contacting the flat surface 90 (rotation stop) of the projection 101 of the pinion shaft 70. When the pinion shaft 70 is engaged with the carrier 71, a gap is kept between the inner peripheral surface of the first cavity 95 and the partially cylindrical surface 89 of the pinion shaft 70. The second cavity 96 is formed at the second radial surface 88 of the carrier 71 near the pinion shaft 70. The second cavity 96 is circular in a plan view, and has the substantially same diameter as the outer peripheral surface 91 of the pinion shaft 70. The second cavity 96 is partially overlapped with the first cavity 95. Overlapped portions of the first and second caveties 95 and 96 extend axially through the carrier 71. Portions of the first and second cavities 95 and 96 which are not overlapped with each other form radial end surfaces, respectively. The radial end surface 93 of the second cavity 96 is complementary in shape and position with the end surface 92 of the pinion shaft 70. Thus, the portion of the second cavity 96 communicated with the first cavity 95 has a D-shaped section which is complementary with that of the projection 101 of the pinion shaft 70.

The carrier 71 of the above structure is processed as follows. First, press working (stamping or embossing) is performed on a sheet material, preferably a metal plate, to finish the shape of the carrier 71 other than the second cavities 96 into the form having a predetermined size and shape. This press working forms cavities at the first radial surface 87, which forms the first concavities 95. Then, the stamped sheet material is milled or otherwise cut to remove material from the second radial surface 88 to form the circular second cavities 96 reaching the bottoms or radial end surfaces of the first cavities 95. In this manner, the fixing apertures 100 are completed by pressing concavities 95 and milling cavities 96. In an assembly operation, the pinion shafts 70 are then fitted into the fixing apertures 100. Then, pinion shafts 70 are fixedly secured to carrier 71 by caulking to keep the relative positions already described. Pinion shafts 70 can be sized to be frictionally secured within fixing apertures if needed and/or desired.

Specifically, the pinion shafts 70 are coupled to the carrier 71 by moving the pinion shafts 70 from positions opposed to the second radial surface 88 of the carrier 71 and into the cavities 96. The projections 101 of pinion shafts 70 are moved through the second cavities 96, and are inserted into the first cavities 95. When the projections 101 are fitted as shown by the broken lines in FIG. 6, the flat surfaces 90 are in contact with the rotation stop surfaces 97 of the second cavities 96. The outer peripheral surfaces 91 of the pinion shafts 70 are in contact with the inner peripheral surfaces 96a of the second cavities 96, and the end surfaces 92 are in contact with the bottom or wall surfaces 93.

The pinion shafts 70 are unmovable with respect to the carrier 71 owing to close fitting of its columnar portion into the second cavity 96, and are non-rotatable with respect to the carrier 71 due to contact of the flat surfaces 90 with the rotation stop surfaces 97. The pinion shafts 70 are axially positioned with respect to the carrier 71 owing to contact of the end surfaces 92 with the bottom or wall surfaces 93.

An operation will now be described below. As seen in, FIG. 1, when the pressure in the working fluid chamber 30 is increased by the working fluid supplied thereto through the oil passage 32, the pressure plate 28 presses the first and second friction plates 17 and 18 together so that the multiple disk clutch 3 is engaged. In this state, a torque transmitted from the input shaft 1 to the input assembly 15 is transmitted to the output member 16 through the friction plates 17 and 18. The torque from the input shaft 1 is further transmitted from the output member 16 to the output shaft 2.

When the pressure in the working fluid chamber 30 is released, the return spring 36 pushes and returns the pressure plate 28 toward the end wall 9 so that the first and second friction plates 17 and 18 are released from each other, and the multiple disk clutch 3 is disengaged. Even in this state, the torque transmitted from the input shaft 1 to the input assembly 15 is transmitted to the carrier 72 through the first outer cylindrical portion 23 of the input assembly 15 as shown in FIG. 5.

In the multiple disk clutch 6 shown in FIG. 5, the piston plate 55 presses the first and second friction plates 50 and 51 to each other when the working fluid in the working fluid chamber 57 is pressurized. When the multiple disk clutch 6 is engaged in this manner, the spline hub 65 is fixed to the outer peripheral wall 52. Accordingly, the pinion assembly formed of the pinions 66 and 67 and the carriers 71 and 72 rotates together with the input assembly 15, and the torque of the input assembly 15 is transmitted to the output shaft 2 through the pinion 67.

In the above operation, the lubricating oil is supplied from the oil passage 44 in FIG. 1 to the annular space 45 through the oil passage 46 in FIG. 2. The lubricating oil flows into the space 47 through the grooves 43a between the thrust bearing 43 and the output member 16, further reaches the inner periphery of the second cylindrical portion 25, and then flows through the oil apertures 48 to the surfaces of the first and second friction plates 17 and 18. Thereby, overheating and abnormal abrasion of the surfaces of the first and second friction plates 17 and 18 are prevented. The lubricating oil passed over the surfaces of the first and second friction plates 17 and 18 flows through the outer oil apertures 49, and is discharged outward therefrom.

In this lubricating operation, the lubricating oil flowing radially outward through the space 47 is guided by the guide portions 41 of the spring retaining member 35 to the oil apertures 48. Therefore, the amount of the lubricating oil flowing into the oil apertures 48 increases so that the surfaces of the first and second friction plates 17 and 18 can be effectively lubricated.

In the multiple disk clutch 6 shown in FIG. 5, the first and second friction plates 50 and 51 are likewise lubricated effectively as described below. A part of the lubricating oil supplied from the oil passage 46 (FIG. 2) flows into the space inside the cylindrical portion 79 through the space between the end of the input shaft 1 and the cylindrical end portion 79, and partially flows through the oil aperture 85 formed at the cylindrical portion 79 to the pinions 66 and 67 and other portions for lubricating them.

The lubricating oil inside the cylindrical portion 79 also flows through the oil apertures 84 and 85 at the cylindrical portion 79 into the space 83 near the bearing 11. The lubricating oil then flows through the grooves 77a at the inner peripheral portion 77 into the space 81. The lubricating oil in the space 81 is guided by the guide portions 80 of thrust washer 78 so that the oil efficiently flows into the oil passages 82. The lubricating oil then flows from the oil passages 82 onto the surfaces of the first and second friction plates 50 and 51 for lubricating them. As described above, the guide portions 80 of the thrust washer 78 concentrate the lubricating oil to the oil passages 82 so that overheating and abnormal abrasion of the first and second friction plates 50 and 51 are effectively prevented.

Figure 8:
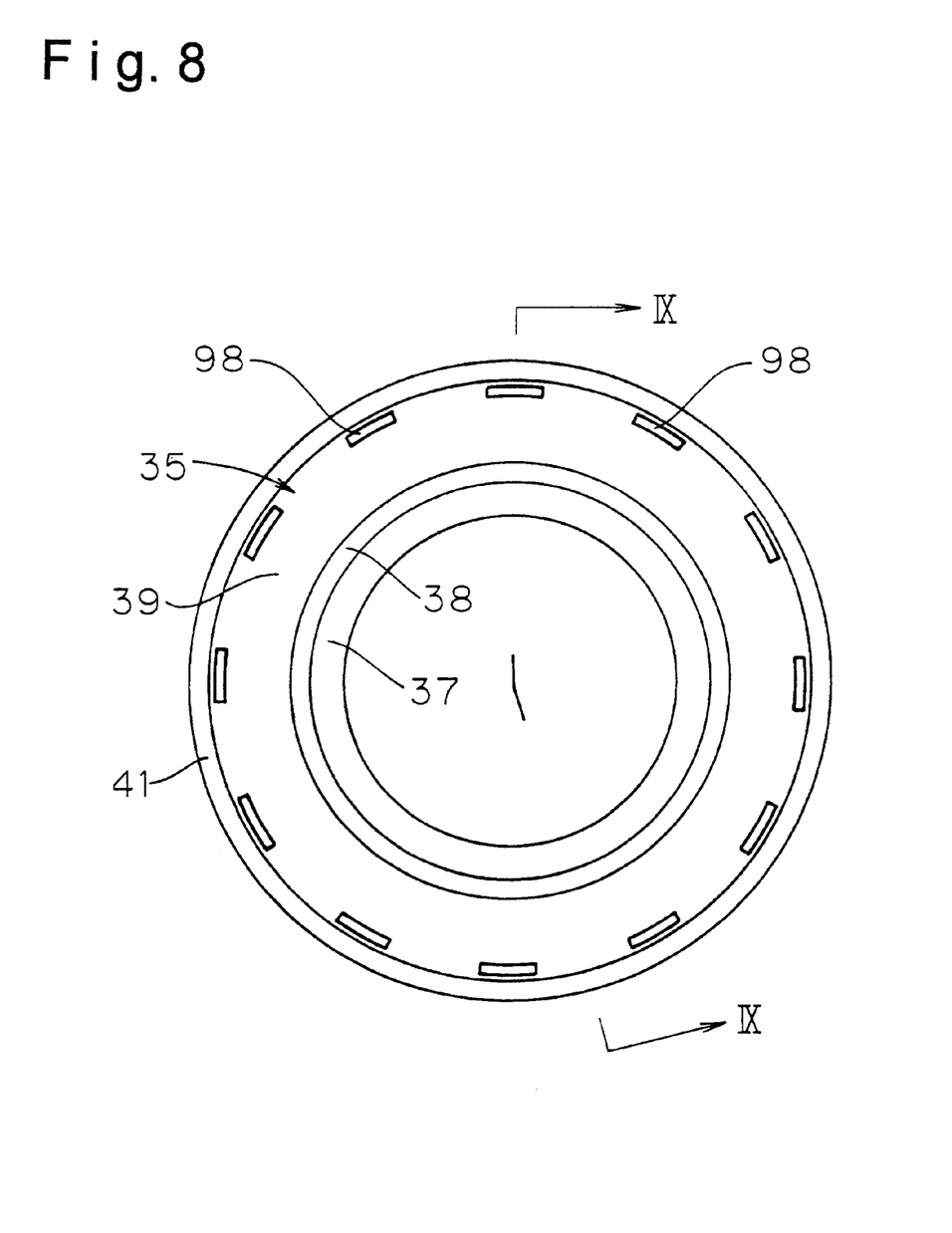
FIG. 8 is a right side elevational view of an alternate spring retainer in accordance with another embodiment of the present invention.
Figure 9:
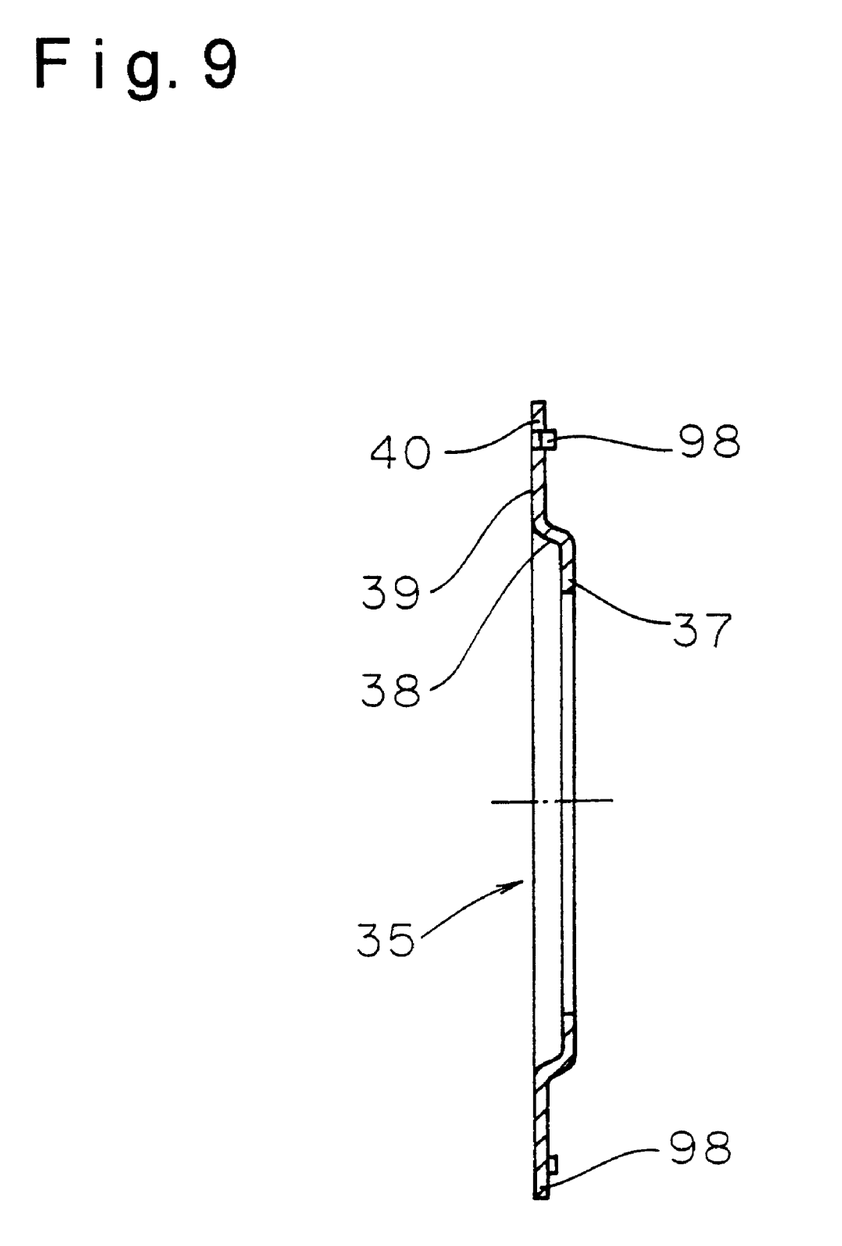
FIG. 9 is a cross-sectional view of the alternate spring retainer illustrated in FIG. 8 taken along line IX—IX in FIG. 8.

In the foregoing embodiment, the guide portions 41 are arranged at a plurality of circumferentially spaced positions radially outside the spring retaining member 35 as shown in FIG. 3. Instead of this structure, the guide portion 41 can be a continuous flange extending through the entire circumference of the spring retaining member 35 as shown in FIG. 8.

In this case, a plurality of circumferentially spaced projections 98 are formed by press working instead of the curved portions 40 for retaining the spring in FIG. 3.

According to the invention, as described above, the guide portions 41 formed at the spring retaining member 35 can effectively direct or guide the lubricating oil to the first and second friction plates 17 and 18 of the multiple disk clutch 3. Therefore, the amount of lubricating oil reaching the first and second friction plates 17 and 18 can be sufficiently increased. Since the guide portions 80 formed at the thrust washer 78 can effectively guide the lubricating oil to the first and second friction plates 50 and 51 of the multiple disk clutch 6, the amount of lubricating oil reaching the first and second friction plates 50 and 51 can be sufficiently increased. In the preferred embodiments disclosed herein, a dedicated member is not required as the member for guiding and leading the lubricating oil to the friction plates, i.e., the spring retaining member 35 or the thrust washer 78 is utilized for this purpose. Therefore, the preferred structure is not complicated by a separate dedicated member.

According to the invention described above, the carrier 71 is manufactured by pressing a metal member and the cutting the metal member to form the fixing apertures 100 (first and second cavities 95 and 96). Each fixing aperture 100 has the rotation stop surface 97 engaged with the flat surface 90 (rotation stop portion) formed at the pinion shaft 70. Therefore, the carrier 71 provided with the fixing apertures 100, which has the predetermined functions of stopping rotation and positioning, can be produced by a simpler method than the prior art employing casting.

According to the method of forming the shaft fixing aperture in the plate-like carrying member, the processing can be simple compared with the prior art employing the casting for forming the fixing aperture.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A method for forming a carrying member, comprising the steps of:

providing a sheet material having a first surface facing in a first direction and a second surface facing in a second direction which is opposite to said first direction of said first surface;

forming at least one first cavity in said first surface of said sheet material by press working to deform said first surface; and forming at least one second cavity in said second surface of said sheet material by removing a portion of said second surface of said sheet material adjacent to said first cavity such that a passageway is created between said first and second cavities and a wall surface is created within said second cavity, said first and second cavities forming a shaft fixing aperture.

2. A method for forming a carrying member according to claim 1, wherein said first cavity has a substantially rectangular cross-section.

3. A method for forming a carrying member according to claim 2, wherein said second cavity has a substantially circular cross-section.

4. A method for forming a carrying member according to claim 1, wherein said wall surface of said second cavity is substantially parallel to said first and second surfaces of said sheet material.

5. A method for forming a carrying member according to claim 1, wherein said second cavity is deeper than said first cavity, such that said wall surface is closer to said first surface of said sheet material.

6. A method for forming a carrying member according to claim 1, wherein said press working of said first surface is performed prior to said removing said portion of said second surface.

7. A method for forming a carrying member according to claim 1, wherein said second cavity is offset from said first cavity to form said wall surface.

8. A method for forming a carrying member according to claim 1, wherein said first cavity has a noncircular cross-section.

9. A method for forming a carrying member according to claim 1, wherein a plurality of said first cavities are formed in said first surface of said sheet material, and a plurality of said second cavities are formed in said second surface of said sheet material to form a plurality of said shaft fixing apertures.

10. A method for forming a carrying member according to claim 9, wherein said shaft fixing apertures are arranged in a substantially circular pattern.

11. A method for forming a carrying member according to claim 10, wherein said shaft fixing apertures are substantially equally spaced about said circular pattern.

12. A method for forming a carrying member according to claim 10, wherein said first cavities have a substantially rectangular cross-section.

13. A method for forming a carrying member according to claim 12, wherein said second cavities have a substantially circular cross-section.

14. A method for forming a carrying member according to claim 10, wherein said second cavities have center longitudinal axes that are offset from center longitudinal axes of said first cavities to form said wall surfaces.

15. A method for forming a carrying member according to claim 10, wherein said press working of said first surface is performed prior to said removing said portion of said second surface.

16. A method for forming a carrying member according to claim 10, wherein said press working includes forming a central opening.

17. A method for forming a carrying member according to claim 9, further comprising the step of:

forming a first set of said first cavities in a first substantially circular pattern and a second set of said second cavities in a second substantially circular pattern in which said second circular pattern has a smaller diameter than said first circular pattern.

18. A method for forming a carrying member according to claim 17, further comprising the steps of providing a plurality of shafts with each said shaft having a non-circular cross-section at its free end, and inserting said shafts into said shaft fixing apertures.

\* \* \* \* \*